United States Patent Office 3,397,076
Patented Aug. 13, 1968

3,397,076
SEMICRYSTALLIZED GROUND COATS AND ENAMELED ARTICLES MANUFACTURED THEREFROM
John R. Little, Fairport, and Elbert A. Sanford, Rochester, N.Y., assignors to Ritter Pfaudler Corporation, a corporation of New York
No Drawing. Filed Nov. 20, 1964, Ser. No. 412,865
4 Claims. (Cl. 117—70)

ABSTRACT OF THE DISCLOSURE

A lithium free crystallizable ground coat containing 35–65% $SiO_2$ and 12–45% $BaO$ is deposited on a metal substrate and then fused. A crystallizable cover coat is then applied over the ground coat and fused. Finally the article is heat-treated to partially crystallize both coats in one step.

---

This invention relates generally to a method for making a glass or vitreous enamel coated metal article, and more particularly relates to a method and compositions for obtaining partially crystallized glass or vitreous enamel coatings over alloy metal substrates.

Glass coated metals are widely used in the chemical and pharmaceutical industries as construction materials for applications that require a combination of strength and exceptional corrosion resistance.

To assure good adhesion between the base metal and the glass coatings, it is common to pretreat the surface as by sandblasting, degreasing, decarburization, etc. A further expedient, well known in the art is the application of a ground-coat enamel upon the surface of the metal. Ground coats are specially formulated to enhance uniform coating over the base metal and to form a strong bond between the surface or cover coat and the base metal. These ground coats are characterized by low surface tension, the ability to wet the metal surface and the capacity of dissolving oxides that form when the composite article is heated. In addition to improved adherence, the ground coat also must be substantially free of enameling defects such as pin holes, and is effective in controlling or contributing to the properties of the glass metal composite. After the aforesaid ground coat has been applied, one or more cover coats are applied thereover. These cover coats are formulated to provide the surface characteristics required for the particular application.

Recently, partially-crystallized glass cover coats have been developed for use at temperatures in excess of 1000° F. Although many ground coat formulations are presently available, they are not suitable for use in systems where operating temperatures exceed 500° F., because they exhibit softening temperatures, i.e., the temperature at which flow of the ground coat will occur, of less than 1000° F. Because of the relatively low softening points of these conventional ground coats, they are susceptible to thermal degradation when used at the normal operating temperatures of these newly developed high temperature surface or cover coatings. This degradation results in a premature failure of the glass-metal composite. In addition, these new cover coats exhibit improved physical and mechanical properties, such as resistance to thermal shock and impact resistance, that far exceed the properties of conventional ground coats. Thus, when conventional ground coats are used with these new high strength cover coats, the properties of the cover coats cannot be fully utilized because of the weaknesses of the ground coats. It is therefore the primary object of this invention to provide ground coats with softening points suitable for use at operating temperatures in excess of 1000° F. and with improved thermal shock resistance and impact resistance.

Because of the higher operating temperatures of systems including these new cover coats, it is necessary to provide ground coats that have sufficient thermal stability to inhibit excessive thermal degradation during use. It is accordingly an object of this invention to provide ground coats exhibiting thermal stability when exposed to temperatures in excess of 1000° F. for several hundred hours.

During the initial firing of a ground coat, it is important that it flow rapidly and easily over the base metal to assure the uniform coating and the intimate contact that will facilitate good bonding between the ground coat and the base metal. Therefore, low viscosity at the temperature of fusion is an essential characteristic of an effective ground coat. However, to provide desirable physical properties, such as thermal shock resistance, impact resistance and thermal stability, it is necessary to strengthen the ground coat by making it more refractory. To solve the above problems, it has been proposed to increase the refractoriness of ground coats by adding refractory oxides to the presently used amorphous compositions. However, we have found that the refractory coatings produced in this manner exhibit erratic physical properties when used in glass-metal systems. It has also been proposed to vary the composition of the ground coat to achieve a high softening point. Although such variation may produce more refractory coatings, the resultant ground coats exhibit high viscosity at normal firing temperatures and therefore require excessively high firing temperatures to produce the low viscosity necessary to provide smooth, even coatings. It is thus another object of this invention to provide a ground coat composition that exhibits the combined properties of low viscosity during the initial firing and increased refractoriness in the final product.

Although the compositions hereinafter disclosed may be used without a cover coat, this invention is specifically directed to a composite article comprising at least three layers; namely, a metal substrate, a partially crystallized glass ground coat, and a partially crystallized glass cover coat.

To function properly as a composite article, the thermal expansivity of the individual glass coats must be carefully controlled to obtain maximum physical properties. Glass or vitreous enamel is known to be stronger in compression than in tension, thus thermal expansion of the ground coat should not be greater than that of the base metal. However, even though compression is desirable, the magnitude of such compression should be controlled. Where the thermal expansivity of the ground coat is the same as or only slightly less than the base metal, interfacial shearing stresses are reduced. Furthermore, since the ground coat is sandwiched between the base metal and the cover coat, these same conditions dictate that the cover coat thermal expansivity should be the same as or slightly less than the ground coat. This lowers the interfacial stress and thereby minimizes the possibility of violent failure when the composite is exposed to thermal shock. Thermal expansion characteristics are also important in preventing catastrophic losses on impact. Therefore, a specific object of this invention is to provide a ground coat composition exhibiting thermal expansion characteristics compatible for use in a partially crystallized glass-metal composite.

Another important function of a ground coat is the solution of the metal oxides formed on the surface of the metal base during the firing of the ground coat glass. If the ground coat does not dissolve the scale or surface oxides formed during processing, the glass will not adhere properly and the composite article will be unsatisfactory. The importance of scale solution increases as the temperatures of treatment and use increase. It is thus another object of this invention to provide glass compositions capable of dissolving the metal oxides formed during the initial processing and capable of continuing to dissolve the oxides that will be formed during high temperature use.

As hereinbefore stated, an important function of the ground coat is the solution of surface oxides. Many high alloy, high temperature, high strength base metals, such as stainless steels, Inconels, Hastelloys, etc. develop less scale than other base metals, such as mild steels. The metal substrates for which the following glass compositions are suitable are alloys such as these in which the major elements are cobalt, chromium, nickel, iron, or combinations thereof. These may include minor quantities of alloying elements, but carbon steels are not within the scope of this application. It is thus an object of this invention to provide specific ground coat compositions suitable for use with the above enumerated and similar substrates.

As previously stated, the ground coat must also be substantially free of enameling defects such as pinholes, blisters, etc. We have found that conventional silicate crystallized glasses of the type used for enameling metal substrates are not suitable for use as ground coats, as they tend to react with the base metal to form enameling defects. Specifically, we have found that lithium-containing glasses are unsuitable for the above reasons. Conversely, we have found that barium silicate crystallized glasses of a type heretofore considered unsuitable for use as crystallized enamel coatings do not form such defects. Accordingly, it is yet another object of this invention to provide lithium-free, barium-containing ground coat compositions that are formulated to effect the above stated objects of high temperature strength and thermal stability, yet also be substantially free of enameling defects.

It is an additional object of this invention to provide glass compositions that exhibit some degree of corrosion resistance and thus may be used without additional surface coating in mildly corrosive surroundings where a thin coating is required.

It is a further object of this invention to provide a composite article comprising the novel ground coats disclosed herein and a method for making said composite article.

Other objects and advantages of this invention will become apparent when read in conjunction with the following description of our invention.

We have found that the above objects are achieved by the application of a specifically formulated devitrifiable ground coat onto a metal substrate in the form of a slip, fusing said slip to form a vitreous coating, applying one or more devitrifiable glass cover coats over said ground coat, fusing said additional glass coats, and heat treating said article to partially crystallize said ground coat and said cover coats in one step.

We have found that compositions within the following ranges (expressed in weight percent) are suitable for use as partially crystallized ground coats in our glass metal systems.

| | Percent |
|---|---|
| $SiO_2$ | 35 to 65 |
| $BaO$ | 12 to 45 |
| $B_2O_3$ | 0 to 10 |
| $Na_2O$ | 0 to 15 |
| $K_2O$ | 0 to 15 |
| $TiO_2$ | 5 to 16 |
| $CaO$ | 0 to 7 |
| $MgO$ | 0 to 7 |
| Adherence oxides | ½ to 3 |

In silicate crystallized glasses it is known that lithium oxide can act as a combined crystal former (lithium silicates) and flux. However, we found that lithium oxide was unsuitable for use in crystallized ground coats because it reacted with the base metal to form defects, such as pinholes, blisters, etc. that could not be tolerated in our systems.

Sodium or potassium oxides, as other alkali oxides, were logical substitutes for lithium, however, they are not as prone to crystallize as lithium and while they are still used for their fluxing action they cannot be depended upon as a primary source of crystallization. Further, in the quantities necessary to function as a primary crystal former, the resulting glasses exhibit insufficient corrosion resistance. In addition, we have found that attempts to add large amounts of $Na_2O$ and $K_2O$ as primary crystal formers were not successful as the fluxing action was too great and the glasses too soft for practical use.

Barium oxide, which is a known crystal former was not originally considered as useful for our purposes, because (a) it is not as effective a flux as lithium or the other alkali oxides, (b) according to available phase diagrams barium silicate crystals form at higher temperatures than lithium silicates, and at temperatures substantially higher than those to which we are limited by our metal substrates, and (c) the initial glasses we made containing substantial amounts of barium were more refractory and more difficult to crystallize than others, for instance those containing lithium oxides.

Notwithstanding the above-mentioned properties of barium oxide, which would prima facie indicate its unsuitability for use in substantial amounts, we have found that the inclusion of barium oxide, within the disclosed ranges, permits the formation of a heretofore not available ground coat having the apparently anomalous properties of low viscosity at firing temperatures, ease of crystallization and increased refractoriness at the temperatures of use. For optimum results the total content of $SiO_2$ and $BaO$ should be within the range of 55 to 85%.

The following specific examples will further illustrate the practice of the subject invention:

Example I

Raw batch materials were mixed in amounts calculated to provide a glass having a weight percent analysis of:

| | Percent |
|---|---|
| $SiO_2$ | 60 |
| $BaO$ | 14 |
| $Na_2O$ | 10 |
| $TiO_2$ | 14 |
| $Co_3O_4$ | 1 |
| $Fe_3O_4$ | 1 |

The resulting batch was melted and then quenched directly in cold water to produce a frit. The frit was milled in water with appropriate mill additions, including clay, potassium chloride, sodium nitrite, etc. to keep the glass in suspension and to form an enamel slip. The slip was spray applied to an Inconel 600 plate, the surface of which had been previously blasted with $Al_2O_3$ grit. The article was then heated to the fusion temperature of the glass slip, about 1900° F. thereby forming an amorphous ground coat that exhibited a viscosity of about 3000 poises at said fusion temperature.

After cooling the ground coat to room temperature, a devitrifiable cover coat was applied thereon and fired. Finally the composite article was heat treated at a temperature between 1450–1600° F., thereby partially crystallizing both the ground and cover glass coats.

A comparison of thermal shock properties of the resulting article with an article similarly treated but including an amorphous borosilicate ground coat instead of a devitrifiable ground coat showed an increase of 150° F. in the temperature at which the first visible glass loss occurred and an increase of 325° F. in the temperature at which significant glass loss occurred.

A comparison of impact resistance revealed that the plate having the crystallized ground coat could be safely subjected to 70% more impact force before exhibiting the first electrical contact between a probe and the base metal at an applied voltage of 10,000 volts.

Example II

Raw materials were mixed in amounts calculated to provide a glass having a weight percent analysis of:

| | Percent |
|---|---|
| $SiO_2$ | 52 |
| BaO | 15 |
| $Na_2O$ | 15 |
| $TiO_2$ | 10 |
| CaO | 6.0 |
| $Co_3O_4$ | 1.0 |
| $Fe_3O_4$ | 1.0 |

After application of a slip formed as in Example I, the article was heated to the fusion temperature of the glass slip, between 1700 and 2000° F., thereby forming an amorphous ground coat that exhibited a viscosity of about 3000 poises at said fusion temperature.

After cooling, a devitrifiable cover coat was fired over the ground coat and the composite article was heat treated at a temperature between 1400° F. and 1650° F., thereby partially crystallizing both the ground and cover glass coats.

Example III

Raw materials were mixed in amounts calculated to provide a glass having a weight percent analysis of:

| | Percent |
|---|---|
| $SiO_2$ | 40 |
| BaO | 40 |
| $B_2O_3$ | 6 |
| $K_2O$ | 4 |
| $TiO_2$ | 9 |
| $Co_3O_4$ | 1 |

After application of a slip formed as in Example I, the article was heated to the fusion temperature of the glass slip, about 1950° F., thereby forming an amorphous ground coat that exhibited a viscosity of about 3000 poises at said fusion temperature.

After coating a devitrifiable cover coat was fired over the ground coat and the composite article was heat treated at a temperature of about 1600° F., thereby partially crystallizing both the ground and cover glass coats. The major crystal formed in the above composition is barium titanium silicate.

In the compositions set forth above, potassium oxide and sodium oxide are used as fluxes. They are also used to control thermal expansion. These compounds cumulatively should not be present in amounts exceeding 20%, as excessive amounts can inhibit or reduce crystallinity. If alkali is present in small amounts, then $B_2O_3$ is effectively used to provide some fluxing action. However, more than 10% of $B_2O_3$ will often severely inhibit crystallization, and in our systems its use should be carefully regulated.

Titania is included to aid in crystal formation, however, excessive amounts usually cause pure $TiO_2$ to precipitate and such crystals are not of any particular advantage in these glasses. 0 to 7% of MgO and CaO can be used to further regulate properties such as thermal expansion, workability, etc.

Adherence oxides such as $Cr_2O_3$, NiO, $Fe_3O_4$ and $Co_3O_4$ should be included to promote good glass-metal adhesion.

The addition of oxides other than those specified, such as $Al_2O_3$, $CeO_2$, SrO, ZnO, $ZrO_2$, etc. is within the skill of the art and does not add to or detract from the inventive concept as expressed herein.

The thermal expansion of our ground coats is generally in the range of 4 to $7 \times 10^{-6}$ inch per inch per degree Fahrenheit in the 80 to 800° F. range.

With respect to the heat treatment of the article for initial fusion of the ground coat, it should be noted that we have not specified the time of treatment. This is because the time of heating is dependent not only upon the composition but also varies with the type and thickness of the base metal involved. For example, a 6" x 6" Inconel 600 plate, ⅜" thick generally requires 9–13 minutes heating time to cause fusion of ground coats according to the present invention. Thinner base metals generally transfer heat more readily than thicker base metals and consequently require a lower firing temperature and/or less firing time. Furthermore, we recognize that some crystallization may occur during the "firing on" of the glass coat, particularly where the base metal is relatively thick. This will occur because the relatively slow heating rate causes the thicker metal to pass more slowly through the temperature zone at which crystallization will occur in route to the higher firing temperatures.

A particular advantage of our invention is the ability to heat treat both the ground coat and the cover coat in one step after the initial firing on. The usual heat treatment range is from 1400–1600° F., but in some might be as low as 1200° F. or as high as 1750° F. and for a 6" x 6" plate as described above takes approximately 1½ hours. During this heat treatment the types of crystals that form vary, but more commonly include: barium titanium silicate, diopside, barium silicate, barium disilicate, titanium dioxide, etc.

The term partial crystallization as used herein means the formation of crystals in situ within an amorphous matrix. Wherever the term ground coat is used it should be understood that it also includes the practice of forming a thick ground coat by the successive application of a plurality of thin coats prior to the application of the surface coat.

The term cover coats should also be construed to include a plurality of glass coats each having the composition of a cover coat as contrasted to that of a ground coat. A suitable cover coat composition is as follows:

| | Percent |
|---|---|
| $SiO_2$ | 58.3 |
| $Na_2O$ | 4.5 |
| $B_2O_3$ | 5.1 |
| $TiO_2$ | 9.0 |
| SrO | 3.0 |
| $Li_2O$ | 9.6 |
| $Al_2O_3$ | 10.5 |

With respect to the method of application of the glass coats, although we have described a spraying method, this is not considered a limitation and any of the other commonly used methods such as slushing, are within the scope of our invention.

While we have shown and described the preferred methods and compositions of our invention, it will be apparent that those having the benefit of our disclosure will be able to make various changes and modifications therein, without departing from the spirit of our invention as set forth in the appended claims.

We claim:
1. The method of making a composite glass-metal article comprising the following steps:
    (a) depositing a substantially lithium free crystallizable glass ground coat upon a metal substrate, said ground coat containing 35 to 65% $SiO_2$ and 12 to 45% BaO, the total of said $SiO_2$ and BaO not to exceed 85% and said metal substrate being selected from the group consisting of stainless steels, Inconels and Hastelloys;
    (b) fusing said ground coat;
    (c) depositing a crystallizable cover coat over said ground coat;
    (d) fusing said cover coat; and
    (e) heat treating to partially crystallize said ground coat and said cover coat in one step.

2. The method of claim 1 wherein said crystallizable ground coat further comprises the following by weight percent:

| | Percent |
|---|---|
| $B_2O_3$ | 0 to 10 |
| $K_2O$ | [1] 0 to 15 |
| $Na_2O$ | [1] 0 to 15 |
| $TiO_2$ | 5 to 16 |
| CaO | [2] 0 to 7 |
| MgO | [2] 0 to 7 |
| Adherence oxides | 0.5 to 3 |

[1] The total concentration of $K_2O$ and $Na_2O$ not to exceed 20%.
[2] The total concentration of CaO and MgO not to exceed 10%.

said ground coat being fused upon said metal at a temperature between about 1700° F. and 2000° F.; and said crystallizing heat treatment being effected between about 1200° F. and 1750° F.

3. A glass-metal composite comprising in combination a high alloy, high temperature, high strength metal substrate selected from the group consisting of stainless steels, Inconels and Hastelloys, a layer of partially crystallized substantially lithium free ground coat enamel fused to the surface of said metal substrate, said enamel containing 35 to 65% $SiO_2$ and 12 to 45% BaO, the total of said $SiO_2$ and BaO not to exceed 85%, and at least one cover coat of corrosion resistant enamel covering said ground coat enamel, whereby a smooth continuous, substantially pinhole free enamel coated objected is provided.

4. The article of claim 3, wherein said partially crystallized ground coat enamel comprises the following by weight percent:

| | Percent |
|---|---|
| $B_2O_3$ | 0 to 10 |
| $K_2O$ | [1] 0 to 15 |
| $Na_2O$ | [1] 0 to 15 |
| $TiO_2$ | 0 to 16 |
| CaO | [2] 0 to 7 |
| MgO | [2] 0 to 7 |
| Adherence oxides | 0.5 to 3 |

[1] The total concentration of $K_2O$ and $Na_2O$ not to exceed 20%.
[2] The total concentration of CaO and MgO not to exceed 10%.

References Cited

UNITED STATES PATENTS

| 2,930,713 | 3/1960 | Hoffman | 117—70 |
| 3,062,685 | 11/1962 | Sanford et al. | 117—70 X |

FOREIGN PATENTS 219,667   11/1957   Australia.

OTHER REFERENCES

Chemical Engineering, 67, #20, pp. 130, 132, 134 (1960).

Materials Protection, 1, #6, pp. 40, 42, 44 (1962).

ALFRED L. LEAVITT, *Primary Examiner.*

R. L. BROWDY, *Assistant Examiner.*